(12) United States Patent
Sakakibara et al.

(10) Patent No.: US 9,780,683 B2
(45) Date of Patent: Oct. 3, 2017

(54) POWER CONVERTER WITH A POWER BUFFER CIRCUIT WHOSE BUFFERED POWER IS SMALLER THAN AN AC COMPONENT OF A PULSATING POWER

(71) Applicant: DAIKIN INDUSTRIES, LTD., Osaka-shi, Osaka (JP)

(72) Inventors: Kenichi Sakakibara, Kusatsu (JP); Naoya Yamashita, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/022,287

(22) PCT Filed: Sep. 10, 2014

(86) PCT No.: PCT/JP2014/073891
§ 371 (c)(1),
(2) Date: Mar. 16, 2016

(87) PCT Pub. No.: WO2015/041111
PCT Pub. Date: Mar. 26, 2015

(65) Prior Publication Data
US 2016/0294300 A1 Oct. 6, 2016

(30) Foreign Application Priority Data
Sep. 19, 2013 (JP) .................. 2013-194176

(51) Int. Cl.
*H02M 5/458* (2006.01)
*H02M 1/15* (2006.01)
(Continued)

(52) U.S. Cl.
CPC .......... *H02M 5/4585* (2013.01); *H02M 1/15* (2013.01); *H02M 1/4225* (2013.01);
(Continued)

(58) Field of Classification Search
CPC ........ H02M 1/15; H02M 5/458; H02M 3/158; H02M 5/4585
See application file for complete search history.

(56) References Cited

U.S. PATENT DOCUMENTS

| 8,395,874 B2 | 3/2013 | Yamai et al. | |
| 2008/0104983 A1* | 5/2008 | Yamai | H02M 1/12 62/228.1 |

(Continued)

FOREIGN PATENT DOCUMENTS

| JP | 2006-166654 A | 6/2006 |
| JP | 2011-193678 A | 9/2011 |

(Continued)

OTHER PUBLICATIONS

Haga et al., "Unity Power Factor Operation Control Method for Single-phase to Three-phase Matrix Converter," The Institute of Electrical Engineers of Japan Transactions D, vol. 124, No. 5, 2004, pp. 510-516, with an English abstract.

(Continued)

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

A converter full-wave rectifies a single-phase voltage, and outputs the rectified voltage across DC power supply lines. An inverter receives the rectified voltage, and supplies a three-phase AC current to an inductive load. A power buffer circuit is connected between the DC power supply lines. The power buffer circuit includes a discharge circuit and a charge circuit. The discharge circuit includes a capacitor and a switch connected in series to each other. The discharge circuit is configured, for example, by a boost chopper, and includes a switch, a reactor, and a diode. The power buffer circuit provides and receives part of pulsations of a power (Continued)

input into the converter to and from the DC power supply lines.

10 Claims, 11 Drawing Sheets

(51) Int. Cl.
*H02M 1/42* (2007.01)
*H02M 7/48* (2007.01)
*H02M 3/158* (2006.01)
*H02M 1/00* (2006.01)

(52) U.S. Cl.
CPC .............. *H02M 5/458* (2013.01); *H02M 7/48* (2013.01); *H02M 3/158* (2013.01); *H02M 2001/007* (2013.01)

(56) References Cited

U.S. PATENT DOCUMENTS

| | | | |
|---|---|---|---|
| 2014/0104889 A1* | 4/2014 | Yamada | H02M 3/335 363/16 |
| 2015/0236606 A1* | 8/2015 | Sakakibara | H02M 5/4585 363/37 |
| 2015/0244282 A1* | 8/2015 | Yamashita | H02M 1/4225 363/35 |
| 2015/0280601 A1* | 10/2015 | Sakakibara | H02M 1/15 363/37 |
| 2016/0233782 A1* | 8/2016 | Sakakibara | H02M 1/4225 |
| 2016/0248335 A1* | 8/2016 | Sakakibara | H02M 1/14 |

FOREIGN PATENT DOCUMENTS

| | | | |
|---|---|---|---|
| JP | 2011193678 A | * | 9/2011 |
| JP | 2012-135184 A | | 7/2012 |

OTHER PUBLICATIONS

Irie et al., "Ripple Compensation for a Single-Phase Rectifier by 2-Quadrant Chopper and Auxiliary Capacitor," The Institute of Electrical Engineers of Japan Transactions D, vol. 112, No. 7, 1992, pp. 623-629, with an English abstract.

Ohnuma et al., "Circuit Configuration and Control Strategy of single-to-three Phase Power Converter with Active Buffer and Charge Circuit," The 2010 Annual Meeting of the Institute of Electrical Engineers of Japan, 4-057, Mar. 17-19, 2010, pp. 95-96 (3 pages total), with a partial English translation.

Ohnuma et al., "Comparison between a Boost Chopper and an Active Buffer as a Single to Three Phase Converter," The 2011 Annual Meeting of the Institute of Electrical Engineers of Japan, 4-042, Mar. 16-18, 2011, pp. 80-81 (3 pages total), with a partial English translation.

Krein et al. "Cost-Effective Hundred-Year Life for Single-Phase Inverters and Rectifiers in Solar and LED Lighting Applications Based on Minimum Capacitance Requirements and a Ripple Power Port", Applied Power Electronics Conference and Exposition, APEC 2009, 24th Annual IEEE, IEEE, Piscataway, NJ, USA Feb. 15, 2009, pp. 620-625, XP031442744, ISBN: 978-1-422-2812-0.

Ohnuma et al. "A Control Method for a Single-to-three-phase Power Converter with an Active Buffer and a Charge Circuit", Energy Conversion Congress and Exposition (ECCE), 2010 IEEE, IEEE, Piscataway, NJ, USA, Sep. 12, 2010, pp. 1801-1807, XP031787347, ISBN: 978-1-4244-5287-3.

Wang et al. "A High Power Density Single-Phase PWM Rectifier With Active Ripple Energy Storage", IEEE Transactions on Power Electronics, Institute of Electrical and Electronics Engineers, USA, vol. 26, No. 5, May 1, 2011, pp. 1430-1443, XP011369185, ISSN: 0885-8993, DOI:10.1109/TPEL.2010.2090670.

Wenlong et al., "A novel active power decoupling single-phase PWM rectifier topology", 2014 IEEE Applied Power Electronics Conference and Exposition, APEC 2014, IEEE, Mar. 16, 2014, pp. 89-95, XP032590817, DOI: 10.1109/APEC.2014.6803293.

* cited by examiner

F I G. 4
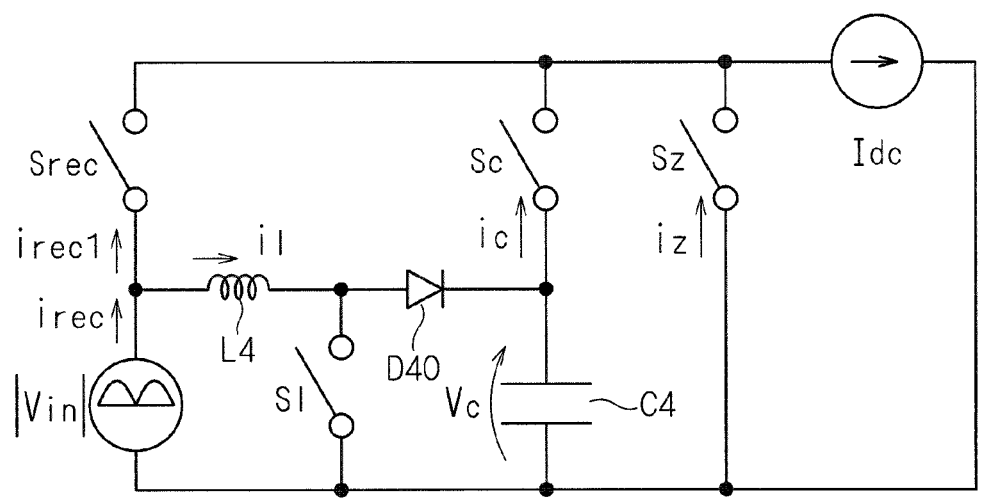

F I G . 7
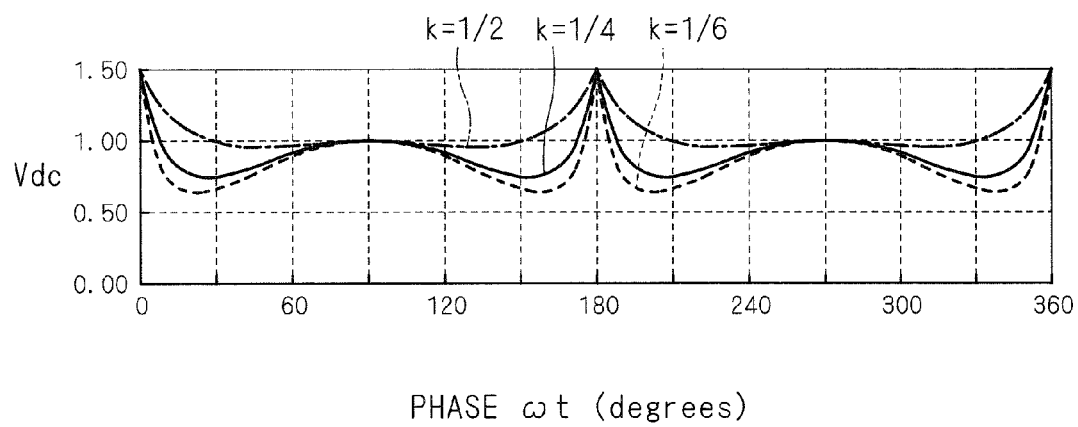

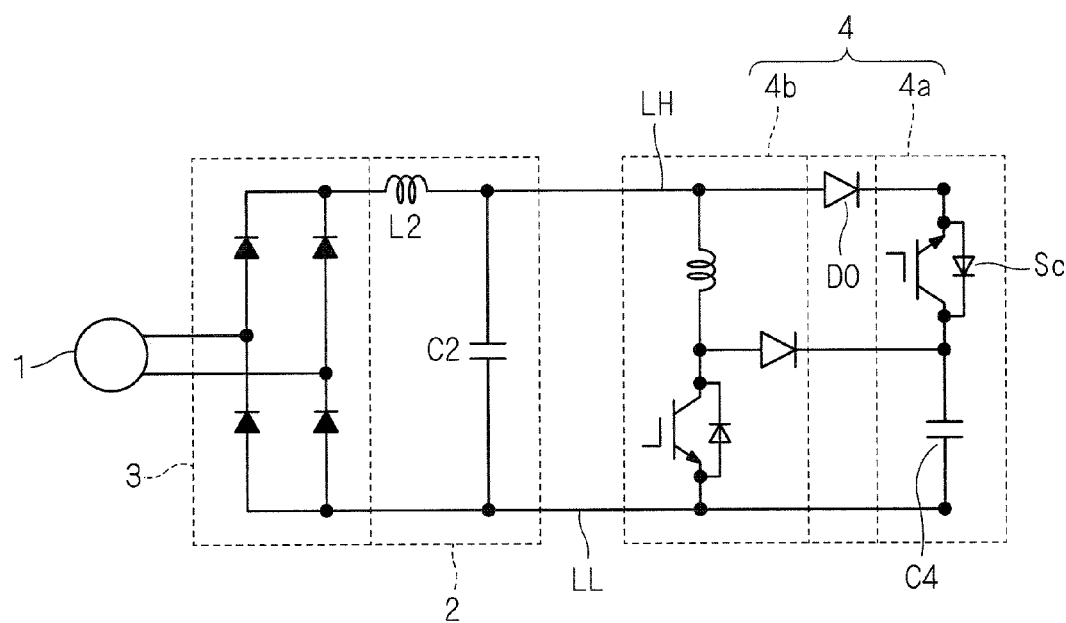
F I G . 1 2

POWER CONVERTER WITH A POWER BUFFER CIRCUIT WHOSE BUFFERED POWER IS SMALLER THAN AN AC COMPONENT OF A PULSATING POWER

TECHNICAL FIELD

The present disclosure relates to a power converter including a power buffer circuit.

BACKGROUND ART

A full-wave rectifying circuit is typically used to obtain a DC voltage from a single-phase AC voltage input from a single-phase AC power supply. Output of the full-wave rectifying circuit, however, has power pulsations having a frequency twice the frequency of the single-phase AC voltage. To reduce the power pulsations, a power buffer circuit for buffering a power is required between an output of the full-wave rectifying circuit and a load. A capacitive element, for example, referred to as a smoothing capacitor is required for buffering of a power.

Irie, Yamashita, and Takemoto, "Ripple Compensation for a Single-Phase Rectifier by 2-Quadrant Chopper and Auxiliary Capacitor", the Institute of Electrical Engineers of Japan Transactions D, Vol. 112, No. 7, pp. 623-629 (1992) discloses a technique for connecting a buffer capacitor to a smoothing capacitor via a current-reversible chopper to absorb a pulsating power. This technique reduces the electrostatic capacitance of the smoothing capacitor and further allows voltage ripples on a buffer side to significantly reduce the total electrostatic capacitance required for smoothing.

Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010) discloses a technique for connecting a buffer capacitor to a DC link via a switching element while removing the smoothing capacitor of Irie, Yamashita, and Takemoto, "Ripple Compensation for a Single-Phase Rectifier by 2-Quadrant Chopper and Auxiliary Capacitor", the Institute of Electrical Engineers of Japan Transactions D, Vol. 112, No. 7, pp. 623-629 (1992). A direct conversion circuit that generates a voltage source by using this technique, and generates a high-frequency link along with a power supply voltage is shown.

Ohnuma, Itoh, "Comparison between a Boost Chopper and an Active Buffer as a Single to Three Phase Converter", the 2011 Annual Meeting of the Institute of Electrical Engineers of Japan, 4-042 (2011) further discloses a technique for converting an input waveform into a sinusoidal waveform, and increasing efficiency.

Japanese Patent Application Laid-Open No. 2011-193678 and Japanese Patent Application Laid-Open No. 2012-135184 applied by the applicant of the present application are listed as documents that disclose techniques relating to the present application.

SUMMARY OF INVENTION

Problems to be Solved by Invention

In power conversion using the technique shown in Irie, Yamashita, and Takemoto, "Ripple Compensation for a Single-Phase Rectifier by 2-Quadrant Chopper and Auxiliary Capacitor", the Institute of Electrical Engineers of Japan Transactions D, Vol. 112, No. 7, pp. 623-629 (1992), a voltage of the buffer capacitor is not required to be controlled to be constant, and thus can be set to be smaller than a normal smoothing capacitor in required electrostatic capacitance, regardless of a direct conversion type or an indirect conversion type.

However, the amplitude of the pulsating power is as great as that of a constant component of a power. A value of an allowable ripple current required by the buffer capacitor is thus high. On the other hand, it is desirable to use an electrolytic capacitor as the buffer capacitor in view of device miniaturization and cost restraints. Due to the use of the electrolytic capacitor as the buffer capacitor, even the buffer capacitor has to have an electrostatic capacitance that is larger than an actually-required electrostatic capacitance and is approximately equal to the electrostatic capacitance of the normal smoothing capacitor to meet the value of the allowable ripple current.

Besides, Haga, Takahashi, Ohishi, "Unity Power Factor Operation Control Method For Single-phase to Three-phase Matrix Converter", the Institute of Electrical Engineers of Japan Transactions D, Vol. 124, No. 5, pp. 510-516 (2004) shows a single-phase to three-phase direct conversion circuit not including an active power buffer circuit. The relation between an input current and output power ripples is shown herein. The need to provide a pulsating power having a frequency twice a power supply frequency to an output power is shown to convert an input waveform into a sinusoidal waveform.

In a household air conditioner of a 1.5 kW class, for example, speed ripples involved in pulsations of a load torque are expected to be suppressed to be approximately 10% by the moment of inertia of a motor. However, the stress of a compressor support system increases as a pulsating torque increases with increasing power capacity. It is therefore clear that power capacity that can be used has an upper limit.

It is an object of the present application to make, in a power converter including an active power buffer circuit, a power buffered by the power buffer circuit smaller than a pulsating power, and to thereby reduce the electrostatic capacitance and the power capacity of the power buffer circuit. This leads to expansion of the range of the power capacity in a case where the load pulsates.

Means for Solving the Problems

A power converter according to the present disclosure includes: a DC link (7) that includes a first power supply line (LH) and a second power supply line (LL); a converter (3) that receives a single-phase AC voltage (Vin), and outputs a pulsating power (Pin) to the DC link; an inverter (5) that receives a power from the DC link, and outputs an AC current (Iu, Iv and Iw); and a power buffer circuit (4) that receives a charge power (Pl) from the DC link, and outputs a discharge power (Pc) to the DC link.

In a first aspect of the power converter, when at least the pulsating power exceeds a predetermined value, a variation (Pc−Pl) of the discharge power to the charge power is smaller than an AC component (Pinˆ) of the pulsating power.

A second aspect of the power converter according to the present disclosure is the first aspect, wherein an input power (Pdc) input from the DC link (7) into the inverter (5) takes a value (Pin+Pc−Pl) obtained by subtracting the charge power from a sum of the pulsating power and the discharge power. When at least the pulsating power exceeds the predetermined value, the charge power (Pl) takes a value (k·Pin) which is a constant (k) (where the constant is a positive number less than ½) times the pulsating power (Pin), and the discharge power (Pc) takes a value (2k·Pinˆ+Pl) obtained by adding the charge power to (−2) times the AC component (Pinˆ) of the pulsating power multiplied by the constant.

A third aspect of the power converter according to the present disclosure is the second aspect, wherein the converter (3) applies a rectified voltage (Vrec) obtained by full-wave rectifying the single-phase AC voltage (Vm·sin (wt)) to the DC link (7) so that a higher electric potential is applied to the first power supply line (LH) than the second power supply line (LL), and allows, when at least the pulsating power exceeds the predetermined value, a current ((1−k)·Im·|sin(ωt)|) obtained by multiplying a first current by a value (1−k) obtained by subtracting the constant from 1 to flow through the DC link, the first current being a current (Im·|sin(ωt)|) obtained by dividing the pulsating power (Pin) by the rectified voltage (Vrec). The power buffer circuit (4) includes: a discharge circuit (4a) that includes a capacitor (C4) and a first switch (Sc and D42) that is connected in series to the capacitor between the first power supply line and the second power supply line so as to be closer to the first power supply line than the capacitor is; and a charge circuit (4b) that charges the capacitor. When at least the pulsating power exceeds the predetermined value, the power buffer circuit (4) receives a charge current (il=k·Im·|sin(ωt)|) which is the constant times the first current, and outputs a discharge current (ic) that is a current (Pc/Vc) obtained by dividing the discharge power (Pc) by a both-end voltage (Vc) across the capacitor.

A fourth aspect of the power converter according to the present disclosure is the second aspect, wherein the converter (3) applies a rectified voltage (Vrec) obtained by full-wave rectifying the single-phase AC voltage (Vin) to the DC link (7) so that a higher electric potential is applied to the first power supply line (LH) than the second power supply line (LL). The power buffer circuit (4) includes: a discharge circuit (4a) that includes a capacitor (C4) and a first switch (Sc and D42) that is connected in series to the capacitor between the first power supply line and the second power supply line so as to be closer to the first power supply line than the capacitor is; and a charge circuit (4b) that charges the capacitor. A rectifying duty (drec) that is a duty at which the converter is in conduction with the DC link (7) takes a value (Vdc/Vm·|sin(ωt)|) obtained by dividing a product of a predetermined voltage (Vdc) and a square (sin²(ωt)) of a sine value of a phase (ωt) of the single-phase AC voltage by the rectified voltage (Vrec). A discharge duty (dc) that is a duty at which the capacitor discharges takes a value (Vdc/Vc·cos²(ωt)) obtained by dividing a product of the predetermined voltage and a square (cos²(ωt)) of a cosine value of the phase by a both-end voltage (Vc) across the capacitor.

A fifth aspect of the power converter according to the present disclosure is any one of the second to fourth aspects, wherein the constant (k) is independent of the AC current (Iu, Iv and Iw).

A sixth aspect of the power converter according to the present disclosure is any one of the second to fourth aspects, wherein the constant (k) is inversely proportional to a magnitude of the AC current (Iu, Iv and Iw).

In any one of the first to sixth aspects, for example, the predetermined value is set so as to be smaller than a maximum rated power of the pulsating power.

Alternatively, in any one of the first to seventh aspects, for example, when the pulsating power is equal to or smaller than a predetermined value, the variation (Pc−Pl) of the discharge power to the charge power is equal to the AC component (Pinˆ) of the pulsating power.

Alternatively, in any one of the first to eighth aspects, for example, when the pulsating power exceeds a predetermined value, the variation (Pc−Pl) of the discharge power to the charge power is independent of the pulsating power.

Effects of Invention

According to the first aspect of the power converter according to the present disclosure, the variation of the discharge power to the charge power, which is a power buffered by the power buffer circuit, is smaller than the AC component of the pulsating power. The power capacity of the power buffer circuit can thus be reduced compared with a conventional technique.

According to the second aspect of the power converter according to the present disclosure, the power buffered by the power buffer circuit is twice a value obtained by multiplying the AC component of the pulsating power by the constant. Since the constant is less than ½, the power buffered is smaller than that buffered by a conventional power buffer circuit, and the second aspect leads to achievement of the first aspect.

According to the third aspect of the power converter according to the present disclosure, a period in which a zero-phase current flows through the inverter can be reduced to thereby increase a period in which a voltage applied to a DC link is used.

The sum of the product of the rectifying duty and the rectified voltage and the product of the discharge duty and the both-end voltage corresponds to an average value of a DC voltage used by the inverter. In the fourth aspect of the power converter according to the present disclosure, the sum matches the predetermined voltage, and can be set to a constant value independently of a phase of the single-phase AC voltage.

According to the fifth aspect of the power converter according to the present disclosure, a ripple current of the capacitor can be reduced in a light-load range, and the life of the power converter can be increased.

According to the sixth aspect of the power converter according to the present disclosure, when a torque of a motor serving as the load of the power converter is small, vibrations of the motor in a low-rpm region can be reduced.

Objects, features, aspects and advantages of the present disclosure will become more apparent from the following detailed description and the accompanying drawings.

BRIEF DESCRIPTION OF DRAWINGS

FIG. 4 is a circuit diagram showing an equivalent circuit of a circuit shown in FIG. 1;
FIG. 7 is a graph showing a virtual DC voltage.

FIG. 12 is a circuit diagram showing a modification of the direct power converter shown in FIG. 1.

DESCRIPTION OF EMBODIMENT

A. Configuration of Direct Power Converter

Figure 1:
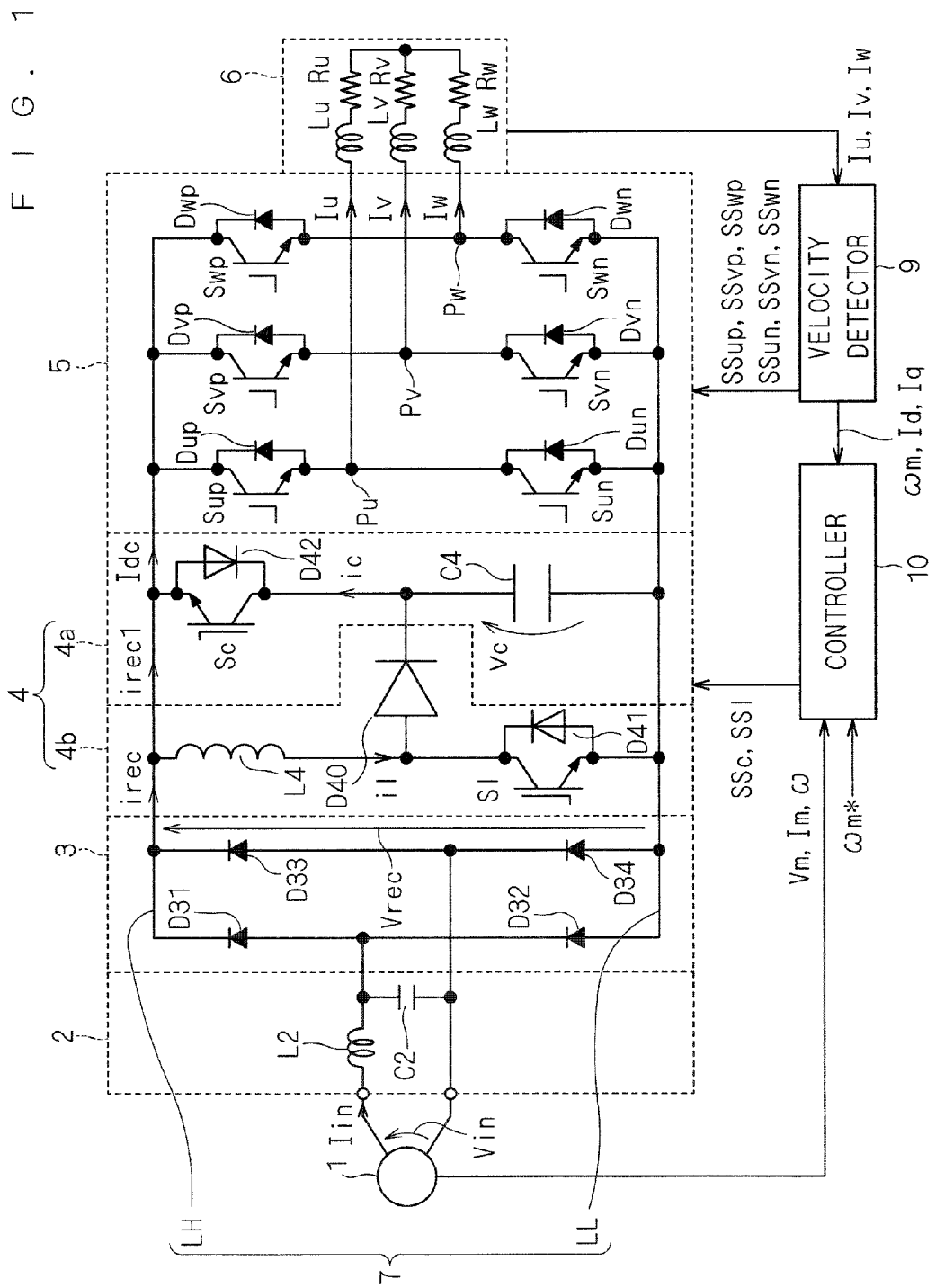
FIG. 1 is a block diagram showing configuration of a direct power converter according to an embodiment.

FIG. 1 is a block diagram showing configuration of a direct power converter to which a control method shown in the present embodiment is applied. The direct power converter includes a converter 3, a power buffer circuit 4, an inverter 5, and a DC link 7.

The converter 3 is connected to a single-phase AC power supply 1, for example, through a filter 2. The filter 2 includes a reactor L2 and a capacitor C2. The reactor L2 is provided between one of two output terminals of the single-phase AC power supply 1 and the converter 3. The capacitor C2 is provided between the two output terminals of the single-phase AC power supply 1. The filter 2 removes a high-frequency component of a current. The filter 2 may be omitted. For the sake of simplicity, the function of the filter 2 is ignored in the following description.

The DC link 7 includes DC power supply lines LH and LL.

The converter 3 uses a diode bridge, for example, and includes diodes D31 to D34. The diodes D31 to D34 constitute a bridge circuit, and convert a single-phase AC voltage Vin, which is an input voltage input from the single-phase AC power supply 1, by single-phase full-wave rectifying into a rectified voltage Vrec, and output it across the DC power supply lines LH and LL. A higher electric potential is applied to the DC power supply line LH than to the DC power supply line LL. An input current Iin flows from the single-phase AC power supply 1 into the converter 3.

The power buffer circuit 4 includes a discharge circuit 4a and a charge circuit 4b, and provides and receives powers to and from the DC link 7. The discharge circuit 4a includes a capacitor C4, and the charge circuit 4b boosts the rectified voltage Vrec, and charges the capacitor C4.

The discharge circuit 4a further includes a transistor (herein an insulated gate bipolar transistor: hereinafter abbreviated as an "IGBT") Sc connected in antiparallel to a diode D42. The transistor Sc is connected in series to the capacitor C4 between the DC power supply lines LH and LL at the side close to the DC power supply line LH. Herein, being connected in antiparallel refers to being connected in parallel with forward directions being opposite to each other. Specifically, a forward direction of the transistor Sc is a direction from the DC power supply line LL towards the DC power supply line LH, and a forward direction of the diode D42 is a direction from the DC power supply line LH towards the DC power supply line LL. The transistor Sc and the diode D42 can collectively be understood as a switch element (first switch). When the first switch is conductive, the capacitor C4 discharges to provide a power to the DC link 7.

The charge circuit 4b includes a diode D40, a reactor L4, and a transistor (herein an IGBT) Sl, for example. The diode D40 has a cathode and an anode, and the cathode is connected between the first switch and the capacitor C4. This configuration is known as a so-called boost chopper.

The reactor L4 is connected between the DC power supply line LH and the anode of the diode D40. The transistor Sl is connected between the DC power supply line LL and the anode of the diode D40. The transistor Sl is connected in antiparallel to a diode D41, and they can collectively be understood as a switch element (second switch). Specifically, a forward direction of the transistor Sl is a direction from the DC power supply line LH towards the DC power supply line LL, and a forward direction of the diode D41 is a direction from the DC power supply line LL towards the DC power supply line LH.

The capacitor C4 is charged by the charge circuit 4b, and a both-end voltage Vc higher than the rectified voltage Vrec is generated. Specifically, a current is allowed to flow from the DC power supply line LH to the DC power supply line LL via the second switch to store energy in the reactor L4, and then the second switch is turned off to store the energy in the capacitor C4 via the diode D40.

Since the both-end voltage Vc is higher than the rectified voltage Vrec, a current basically does not flow through the diode D42. Conduction/non-conduction of the first switch is thus solely dependent on that of the transistor Sc. Not only the transistor Sc but also the first switch including the transistor Sc and the diode D42 may be thus hereinafter also referred to as a switch Sc.

Since the DC power supply line LH is higher than the DC power supply line LL in an electric potential, a current basically does not flow through the diode D41. Conduction/non-conduction of the second switch is thus solely dependent on that of the transistor Sl. Not only the transistor Sl but also the second switch including the transistor Sl and the diode D41 may be thus hereinafter also referred to as a switch Sl.

The inverter 5 converts a DC voltage across the DC power supply lines LH and LL into an AC voltage, and outputs it to output terminals Pu, Pv and Pw. The inverter 5 includes six switching elements Sup, Svp, Swp, Sun, Svn and Swn. The switching elements Sup, Svp and Swp are respectively connected between the output terminals Pu, Pv and Pw and the DC power supply line LH, and the switching elements Sun, Svn, and Swn are respectively connected between the output terminals Pu, Pv, and Pw and the DC power supply line LL. The inverter 5 comprises a so-called voltage source inverter, and includes six diodes Dup, Dvp, Dwp, Dun, Dvn and Dwn.

The diodes Dup, Dvp, Dwp, Dun, Dvn and Dwn are arranged with their cathodes being directed towards the DC power supply line LH and their anodes being directed towards the DC power supply line LL. The diode Dup is connected in parallel to the switching element Sup between the output terminal Pu and the DC power supply line LH. Similarly, the diodes Dvp, Dwp, Dun, Dvn, and Dwn are respectively connected in parallel to the switching elements Svp, Swp, Sun, Svn, and Swn. AC currents Iu, Iv, and Iw are respectively output from the output terminals Pu, Pv, and Pw, and constitute a three-phase AC current. IGBTs are used as the switching elements Sup, Svp, Swp, Sun, Svn, and Swn, for example.

An inductive load 6 is a rotary machine, for example, and is shown by an equivalent circuit representing an inductive load. Specifically, a reactor Lu and a resistor Ru are connected in series to each other, and one end of the series body is connected to the output terminal Pu. The same applies to a reactor Lv and a resistor Rv and to a reactor Lw and a resistor Rw. Respective opposite ends of these series bodies are connected to one another.

B. Control Method

(b-1) Basic Concept of Power Reduction

An instantaneous input power Pin input into the converter 3 is expressed by the following formula (1) with an input power factor being 1. Note that a crest value Vm and a power supply angular velocity ω of the single-phase AC voltage Vin, a crest value Im of the input current Iin, and time t are introduced. The product ωt of the power supply angular velocity ω and the time t represents a phase of the single-phase AC voltage Vin. An AC waveform is understood as the product of a sine value of the phase ωt of the AC waveform and a crest value.

$$Pin = Vm \cdot Im \cdot \sin^2(\omega t) \qquad (1)$$
$$= \frac{1}{2} Vm \cdot Im - \frac{1}{2} Vm \cdot Im \cdot \cos(2\omega t)$$

The instantaneous input power Pin has an AC component $(-\frac{1}{2}) \cdot Vm \cdot Im \cdot \cos(2\omega t)$ (hereinafter, also referred to as an "AC component Pin^") shown by the second term of the right-hand side of the formula (1). The instantaneous input power Pin is thus hereinafter also referred to as a pulsating power Pin.

The power converter shown in FIG. 1 can be understood as follows:

The DC link 7 includes the DC power supply lines LH and LL;

The converter 3 receives the single-phase AC voltage Vin, and outputs the pulsating power Pin;

The power buffer circuit 4 receives a charge power Pl from the DC link 7, and outputs a discharge power Pc to the DC link 7; and The inverter 5 receives, from the DC link 7, an input power Pdc (=Pin+Pc−Pl) obtained by subtracting the charge power Pl from the sum of the pulsating power Pin and the discharge power Pc, and outputs the AC currents Iu, Iv, and Iw.

Figure 2:
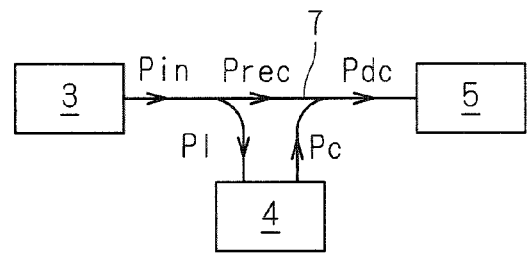
FIG. 2 is a block diagram showing a power balance in the direct power converter according to the embodiment.

FIG. 2 is a block diagram schematically showing a power balance in the direct power converter shown in FIG. 1. A power subjected to buffering (hereinafter, referred to as a "buffering power Pbuf") is equal to a power difference (Pc−Pl) obtained by subtracting the charge power Pl from the discharge power Pc. A power Prec directed from the converter 3 to the inverter 5 is equal to Pin−Pl. Thus, Pdc=Prec+Pc holds.

In conventional techniques shown in Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010) and Japanese Patent Application Laid-Open No. 2011-193678, the charge power Pl and the discharge power Pc each take the same value as the AC component Pin^, and are provided and received between the power buffer circuit 4 and the DC power supply lines LH and LL in mutually exclusive periods of a power supply phase to counteract the above-mentioned AC component Pin^. A power subjected to buffering by the power buffer circuit 4 is thus equal to the absolute value of the AC component Pin^, and the power buffer circuit 4 is required to have a power capacity equal to or larger than the absolute value of the AC component Pin^.

Therefore, described is which technique can reduce the buffering power Pbuf to reduce the power capacity of the power buffer circuit 4.

It is of course undesirable to set the buffering power Pbuf to completely zero as a power input into the inverter 5 pulsates with the second term of the right-hand side of the formula (1), and there is no need to reduce the power capacity of the power buffer circuit 4 in the first place. The buffering power Pbuf is determined by the following formula (2) by introducing a positive constant k less than ½. In other words, achievement of such buffering power Pbuf leads to reduction in power capacity of the power buffer circuit.

$$Pbuf = k \cdot Vm \cdot Im \cdot \cos(2\omega t) \qquad (2)$$

This means that a difference between powers provided and received between the power buffer circuit 4 and the DC power supply lines LH and LL satisfies the formula (2). In other words, if the absolute value of a power (Pc−Pl) that is a variation of the discharge power Pc to the charge power Pl is smaller than the absolute value of the AC component Pin^, the power capacity of the power buffer circuit 4 can be reduced compared with a conventional technique.

By introducing the constant k less than ½ as described above, the buffering power Pbuf can be selected to be small compared with the techniques disclosed in Irie, Yamashita, and Takemoto, "Ripple Compensation for a Single-Phase Rectifier by 2-Quadrant Chopper and Auxiliary Capacitor", the Institute of Electrical Engineers of Japan Transactions D, Vol. 112, No. 7, pp. 623-629 (1992) and Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010). This results in the following advantages of the power buffer circuit 4.

(b-2) Description of Advantages in Discharge Circuit 4a

In this section, reduction of the buffering power Pbuf allows the use of an electrolytic capacitor as the capacitor C4 and achieving the discharge circuit 4a inexpensively is described.

Figure 3:
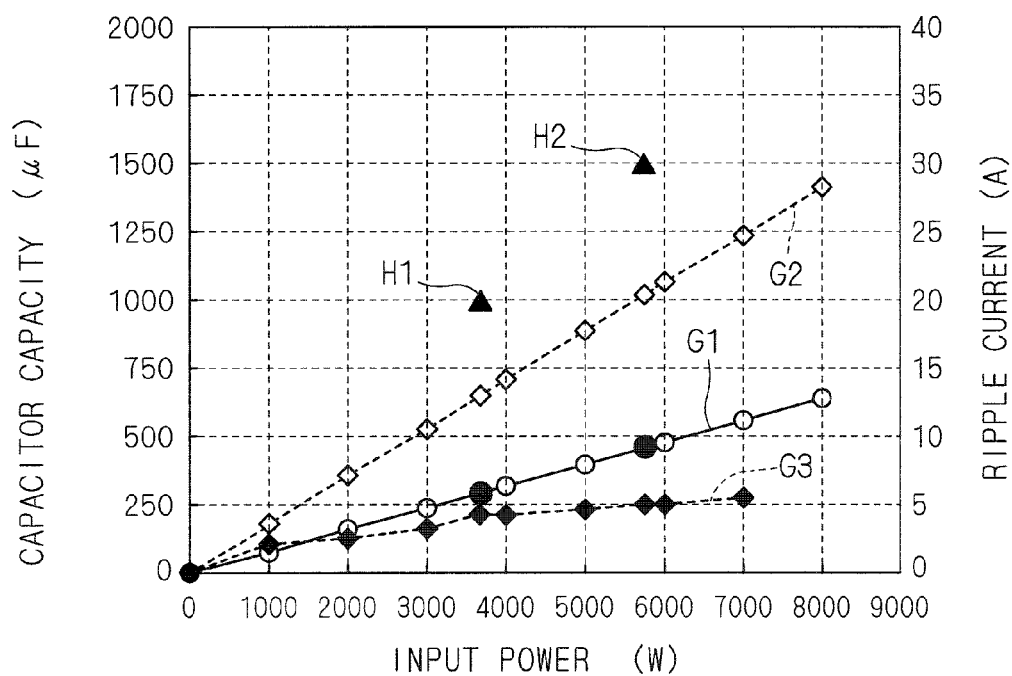
FIG. 3 is a graph showing the relation among an input power, the electrostatic capacitance of a capacitor, and a ripple current in the direct power converter.

FIG. 3 is a graph showing the relation between the electrostatic capacitance (also simply referred to as a "capacitor capacity") (a left vertical axis) of the capacitor used or required in the direct power converter receiving and processing an input power (an average value of the instantaneous input power Pin: a horizontal axis) and a ripple current and an allowable value (a right vertical axis) of the ripple current in the capacitor.

Symbols H1 and H2 each represent the capacitor capacity used in a case where a single-phase power factor correction circuit is used. The symbols H1 and H2 respectively represent data in cases of using air conditioners having air conditioning abilities of 6 kW and 11.2 kW. The power factor correction circuit can herein be understood to have configuration in which the switch Sc has been shorted and removed from the power buffer circuit 4, and a connection point between the reactor L4 and the converter 3 is not directly connected to the inverter 5. In this configuration, the diode D40 and the reactor L4 connected in series to each other are provided between the converter 3 and the inverter 5 in the DC power supply line LH, and the capacitor C4 is connected in parallel to the inverter 5 between the DC power supply lines LH and LL.

In view of the fact that Pdc=Pin−Pin^ holds when k=½, the electrostatic capacitance C required for the capacitor C4 can be obtained from Ohnuma, Itoh, "Comparison between a Boost Chopper and an Active Buffer as a Single to Three Phase Converter", the 2011 Annual Meeting of the Institute of Electrical Engineers of Japan, 4-042 (2011) by the following formula (3). Note that a maximum value Vcmax and a minimum value Vcmin of the both-end voltage Vc are introduced.

$$C = \frac{Vm \cdot Im}{\omega(Vcmax^2 - Vcmin^2)} \quad (3)$$

On a graph G1, calculated values required for capacitor capacities when k=½ (i.e., the buffering power Pbuf is equal to the absolute value of the AC component Pin^) are plotted. Note that the maximum value Vcmax=400+50=450 (V) and the minimum value Vcmin=400−50=350 (V) hold. Solid circles on the graph G1 indicate the same cases indicated by the symbols H1 and H2 in the input power. However, capacitor capacities that are actually used are plotted as the symbols H1 and H2, and, when they are back-calculated from the formula (3), the both-end voltage Vc varies by approximately ±5%.

As can be understood from comparison between the symbols H1 and H2 and the solid circles on the graph G1, the capacitor capacities are reduced to approximately ⅓ to ¼ times compared with a normal power factor correction circuit when k=½.

When k=½, however, a ripple current shown by a graph G2 flows through the capacitor C4. On the other hand, a ripple current (e.g., values obtained at 45° C. using an electrolytic capacitor of a GW series (105° C. specifications) from Nichicon Corporation) allowed when the capacitor capacity obtained by the graph G1 is obtained using the electrolytic capacitor is shown by a graph G3. Comparison between the graphs G2 and G3 suggests that using the electrolytic capacitor cannot achieve the capacitor C4 when k=½ from the perspective of allowing the ripple current.

However, the ripple current flowing through the capacitor C4 can be reduced by setting the constant k so that the constant k is less than ½ compared to a case where k=½. The capacitor C4 can be achieved by the electrolytic capacitor by setting the constant k in accordance with a desired capacitor capacity, leading to achieving the power buffer circuit 4 inexpensively.

(b-3) Description of Advantages in Charge Circuit 4b

In this section, reduction of the buffering power Pbuf to achieve the charge circuit 4b inexpensively is described.

All the instantaneous input powers Pin pass through a normal power factor correction circuit. On the other hand, when the power buffer circuit 4 is used, a power passing through the charge circuit 4b is the charge power Pl, which corresponds to the buffering power Pbuf expressed by the formula (2) in a case where the buffering power Pbuf is positive (see FIG. 2).

The power capacity required for the charge circuit 4b decreases as the buffering power Pbuf decreases. By reducing the buffering power Pbuf, a current il (this can be understood as a charge current input into the charge circuit 4b) flowing through the reactor L4 is reduced, and thus the power capacity required for the reactor L4 is also reduced.

(b-4) Specific Examples of Charge Power Pl and Discharge Power Pc

In and after this section, the above-mentioned charge power Pl and discharge power Pc are respectively determined by the formulas (4) and (5) as examples.

$$Pl = k \cdot Vm \cdot Im \cdot \sin^2(\omega t) \quad (4)$$

$$Pc = k \cdot Vm \cdot Im \cdot \cos^2(\omega t) \quad (5)$$
$$= k \cdot Vm \cdot Im \cdot \cos2(2\omega t) + Pl$$

This means that the charge power Pl is a power which is the constant k times the pulsating power Pin, and the discharge power Pc is a power obtained by adding the charge power Pl to (−2) times the AC component Pin^ multiplied by the constant k.

The charge power Pl can be understood as a power k·Pin distributed from the pulsating power Pin to the power buffer circuit 4 via the DC link 7 at a distribution ratio of the constant k. The constant k is thus hereinafter also referred to as a buffer distribution ratio k.

It is obvious from the formulas (4) and (5) and Pbuf=Pc−Pl that the formula (2) is satisfied.

In contrast to Japanese Patent Application Laid-Open No. 2011-193678 and Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010) in which the charge power Pl and the discharge power Pc are provided and received between the power buffer circuit 4 and the DC link 7 in the exclusive periods of the power supply phase, the exclusive periods of the power supply phase for the charge power Pl and the discharge power Pc are not set.

However, discharge is dominant over charge in a period (hereinafter, also referred to as a "discharge dominant period") in which Pc>Pl (i.e., Pbuf>0), and charge is dominant over discharge in a period (hereinafter, also referred to as a "charge dominant period") in which Pc<Pl (i.e., Pbuf<0). As can be understood from the formulas (4) and (5), a period in which (n+¼)π≤ωt≤(n+¾)π is the charge dominant period, and a period in which (n+¾)π≤ωt≤(n+5/4)π is the discharge dominant period (n is an integer: the same applies hereinafter).

By determining the charge power Pl and the discharge power Pc as described above, a description of the power capacity required for the charge circuit 4b can be more quantitatively than the previous section.

An average value of a power, input into a conventional power factor correction circuit, i.e., input into the reactor, per period of the power supply frequency can be obtained from the formula (6) in view of the formula (1).

$$\frac{Vm \cdot Im}{2\pi} \int_0^{2\pi} \frac{1}{2}(1 - \cos2\theta) d\theta = \frac{Vm \cdot Im}{2} \quad (6)$$

On the other hand, when the power buffer circuit 4 is used, the charge power Pl is input into the power buffer circuit. In view of the formula (4), an average value of a power, input into the power buffer circuit 4, i.e., input into the charge circuit 4b, per period of the power supply frequency can be obtained from the formula (7).

$$\frac{Vm \cdot Im}{2\pi} \int_0^{2\pi} |k \cdot \sin^2 2\theta| d\theta = \frac{Vm \cdot Im}{2} \cdot k \quad (7)$$

As can be understood from comparison between the formulas (6) and (7), the power capacity required for the charge circuit 4b is k times compared with the power factor correction circuit. By setting the buffer distribution ratio k to less than ½, the power capacity required for the charge circuit 4b is reduced to be smaller than one half of the power capacity in the power factor correction circuit.

(b-5) Current Distribution Dependent on Constant k

In this section, a technique for setting a current irec1 flowing from the converter 3 to the inverter 5 out of a current irec output from the converter 3 dependently on the buffer distribution ratio k is described.

The rectified voltage Vrec expressed by the formula (8) is applied to an output side of the converter 3.

$$Vrec = |Vin| = Vm \cdot |\sin(\omega t)| \quad (8)$$

The following formula (9) holds as Prec=Pin−Pl.

$$Prec = (1-k) \cdot Vm \cdot Im \cdot \sin^2(\omega t) = |Vin| \cdot irec1 \quad (9)$$

The current irec1 is thus expressed by the following formula (10).

$$irec1 = (1-k) \cdot Im \cdot |\sin(\omega t)| \quad (10)$$

The formula (1) is based on the premise that the input current Iin is expressed by Im·sin(ωt), i.e., has a sinusoidal waveform, and thus the current il satisfies the following formula (11). As can be seen from FIG. 2, this is because the current irec output from the converter 3 is equal to the sum of the current irec1 and the current il.

$$il = k \cdot Im \cdot |\sin(\omega t)| \quad (11)$$

A peak value of the current il is thus k·Im. In view of the fact that the peak value of the current input into the conventional power factor correction circuit is Im, it is understood that the power capacity required for the reactor L4 is reduced compared with a conventional technique.

When a discharge current ic flowing from the capacitor C4 to the inverter 5 is introduced, the discharge power Pc output from the power buffer circuit 4 is expressed by the product Vc·ic. In order for the discharge power Pc to satisfy the formula (5), the discharge current ic thus satisfies the following formula (12).

$$ic = \frac{Pc}{Vc} = \frac{k \cdot Vm \cdot Im}{2\,Vc}(1 + \cos(2\omega t)) \quad (12)$$

FIG. 4 shows an equivalent circuit of the circuit shown in FIG. 1. The equivalent circuit is introduced in Japanese Patent Application Laid-Open No. 2011-193678, for example. In the equivalent circuit, the current irec1 is equivalently expressed as a current irec1 passing through a switch Srec when the switch Srec is conductive. Similarly, the discharge current ic is equivalently expressed as a current ic passing through the switch Sc when the switch Sc is conductive. A current flowing through the inverter 5 to the inductive load 6 when the output terminals Pu, Pv and Pw are connected in common to any one of the DC power supply lines LH and LL in the inverter 5 is also equivalently expressed as a zero-phase current iz flowing through a switch Sz when the switch Sz is conductive. FIG. 4 also shows the reactor L4, the diode D40 and the switch Sl constituting the charge circuit 4b, and additionally shows the current il flowing through the reactor L4.

In the equivalent circuit thus obtained, the following formula holds by introducing duties drec, dc, and dz at which the switches Srec, Sc, and Sz are respectively conductive and a DC current Idc input into the inverter 5.

$$\begin{bmatrix} irec \\ ic \\ iz \end{bmatrix} = \begin{bmatrix} drec & 1 \\ dc & 0 \\ dz & 0 \end{bmatrix} \cdot \begin{bmatrix} Idc \\ il \end{bmatrix} \quad (13)$$

The currents irec1, ic and iz are obtained by multiplying the DC current Idc by the duties drec, dc and dz, respectively, and thus are average values in switching cycles of the respective switches Srec, Sc and Sz.

The DC current Idc is the sum of the currents irec1, ic, and iz flowing through by the respective switches Srec, Sc and Sz, and thus the following formula holds. Note that 0≤drec≤1, 0≤dc≤1, and 0≤dz≤1.

$$drec + dc + dz = 1 \quad (14)$$

The duties drec, dc and dz can thus be considered as current distribution ratios of the DC current Idc to the respective currents irec1, ic, and iz. The duty drec is hereinafter also referred to as a rectifying duty drec, as the duty drec is a duty at which a period in which the converter 3 is connected to the DC link 7, and allows a current to flow through the inverter 5 is set. The duty dc may be hereinafter also referred to as a discharge duty dc as the duty dc is a duty at which the capacitor C4 discharges. The duty dz may be hereinafter also referred to as a zero duty dz as the duty dz is a duty at which the zero-phase current iz always flows through the inverter 5 regardless of a voltage output from the inverter 5.

The rectifying duty drec and the discharge duty dc are respectively set by the following formulas (15) and (16) from the formulas (10), (12) and (13).

$$drec = (1-k) \cdot \frac{Im}{Idc} \cdot |\sin(\omega t)| \quad (15)$$

$$dc = k \cdot \frac{Vm}{2Vc} \cdot \frac{Im}{Idc} \cdot (1 + \cos(2\omega t)) \quad (16)$$

That is to say, the formulas (10), (12), (15) and (16) are used to meet the demand for the power balance, and the formula (11) is used to further meet the demand for making the input current Iin have a sinusoidal waveform and satisfaction of the formula (1) on which the above-mentioned formulas are based.

In a case where the diode bridge is used as the converter 3, the converter 3 cannot actively be switched at the rectifying duty drec expressed by the formula (15). By switching the inverter 5 and the switch Sc respectively in accordance with the zero duty dz and the discharge duty dc determined by the formulas (14), (15) and (16), the current irec1 expressed by the formula (10) can be obtained.

The inverter 5 cannot utilize the DC voltage at the DC link 7 in a period in which the zero-phase current iz flows. A virtual DC voltage (hereinafter, referred to as a "virtual DC voltage") Vdc in a period in which the inverter 5 can perform power conversion out of the DC voltage across the DC power supply lines LH and LL can be considered as follows.

$$Vdc = Vrec \cdot drec + Vc \cdot dc + 0 \cdot dz \quad (17)$$

This can be understood as a voltage applied to the DC link 7 as an average of the maximum value of a voltage that the inverter 5 can output, in a period in which switching of the switches Sc and Sl and the inverter 5 is controlled. In FIG. 4, the virtual DC voltage Vdc is understood as a voltage generated across a current source Idc (which flows the DC current Idc) representing the inverter 5 and a load thereof.

A ratio R (=Vdc/Vm) of the virtual DC voltage Vdc to the crest value Vm is hereinafter referred to as a voltage utilization ratio. It is understood from the formulas (13), (14) and (16) that, by reducing the zero duty dz, a period in which the inverter 5 flows the zero-phase current can be reduced, and a period in which a voltage applied to a DC link 7 is utilized can be thereby increased. This leads to an increase in voltage utilization ratio R.

Incidentally, the input power Pdc input from the DC link 7 into the inverter 5 is the product of the virtual DC voltage Vdc and the DC current Idc. Since the inverter 5 obtains, from the DC link 7, the input power Pdc (=Pin+Pc−Pl) obtained by subtracting the charge power Pl from the sum of the pulsating power Pin and the discharge power Pc, the following formula (18) holds.

$$Idc = \frac{Pin + Pc - Pl}{Vdc} \qquad (18)$$
$$= \frac{Vm \cdot \text{Im}}{2}(1 - (1 - 2k)\cos(2\omega t)) \cdot \frac{1}{Vdc}$$

Note that neither the virtual DC voltage Vdc nor the DC current Idc is limited in the settings having described so far. This means that, once the buffer distribution ratio k is determined, the duties drec, dc, and dz can be set regardless of settings of the virtual DC voltage Vdc and the DC current Idc as long as the virtual DC voltage Vdc and the DC current Idc satisfy the formula (18).

Requirements for an increase in voltage utilization ratio R as a new effect is now described. As described above, the voltage utilization ratio R can be increased by reducing the zero duty dz, and a lower limit of the zero duty dz is zero. The duties drec and dc when the virtual DC voltage Vdc is the highest per buffer distribution ratio k can be obtained when the zero duty dz is zero.

If the zero duty dz is zero, the formula (19) is obtained from the formulas (14), (15) and (16).

$$\frac{\text{Im}}{Idc}\left\{(1-k)\cdot|\sin(\omega t)| + \frac{k\cdot Vm}{2Vc}(1+\cos(2\omega t))\right\} = 1 \qquad (19)$$

The both-end voltage Vc can herein be considered to be approximately constant (vary by approximately 5%, for example, as described above) even if charge and discharge are performed by the power buffer circuit 4. The DC current Idc when the virtual DC voltage Vdc is the highest per buffer distribution ratio k is determined from the formula (19). As a result, the duties drec and dc when the virtual DC voltage Vdc is the highest per buffer distribution ratio k are determined from the formulas (15) and (16). The virtual DC voltage Vdc in this case is determined by the formulas (18) and (19).

The DC current Idc when the virtual DC voltage Vdc is the highest as described above takes a minimum value in view of the formula (18). This is desirable to reduce power ratings of the switching elements Sup, Svp, Swp, Sun, Svn and Swn and the diodes Dup, Dvp, Dwp, Dun, Dvn and Dwn used in the inverter 5.

Figure 5:
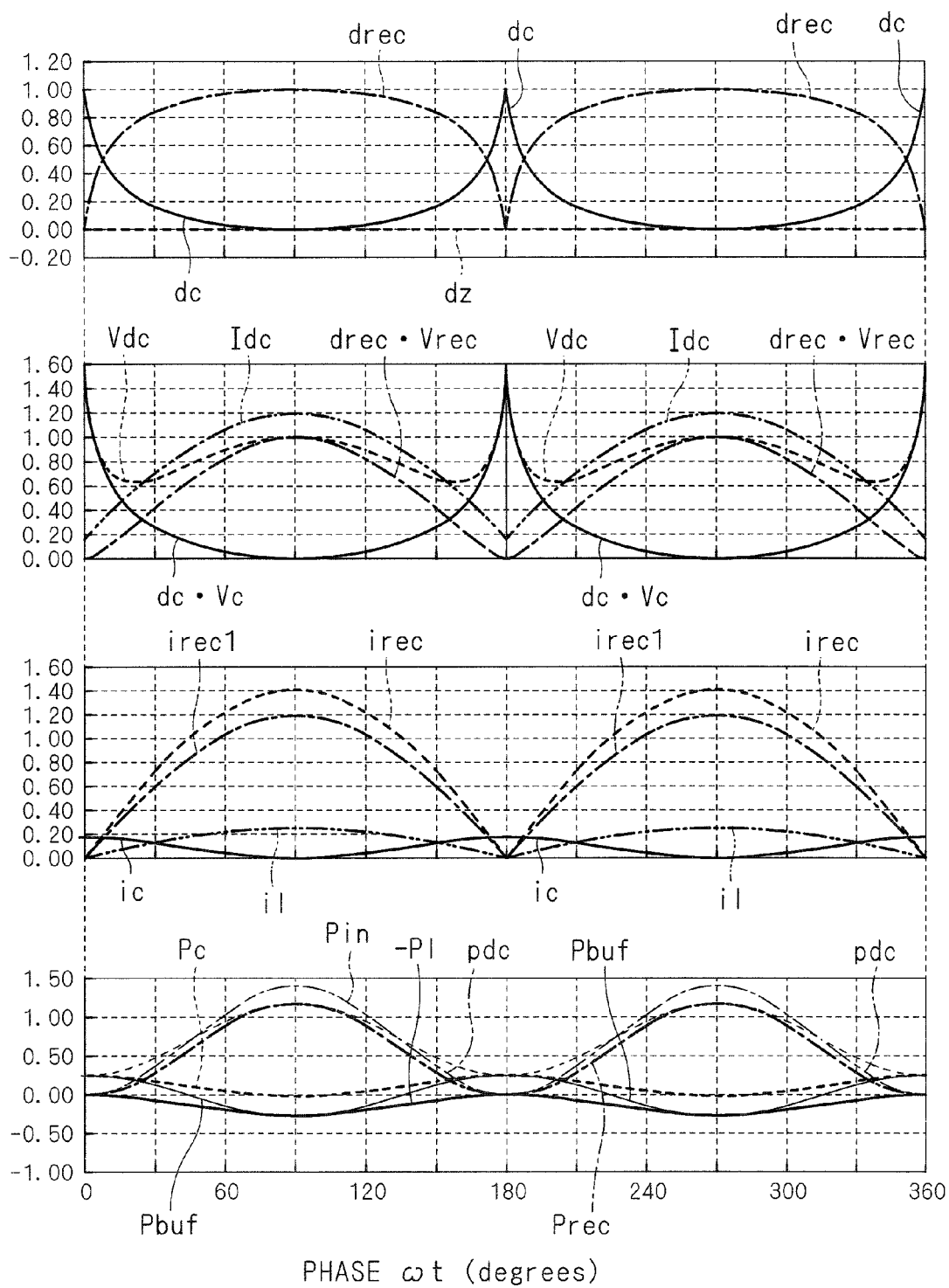
FIGS. 5 and 6 are graphs showing operation of the direct power converter according to the embodiment.
Figure 6:
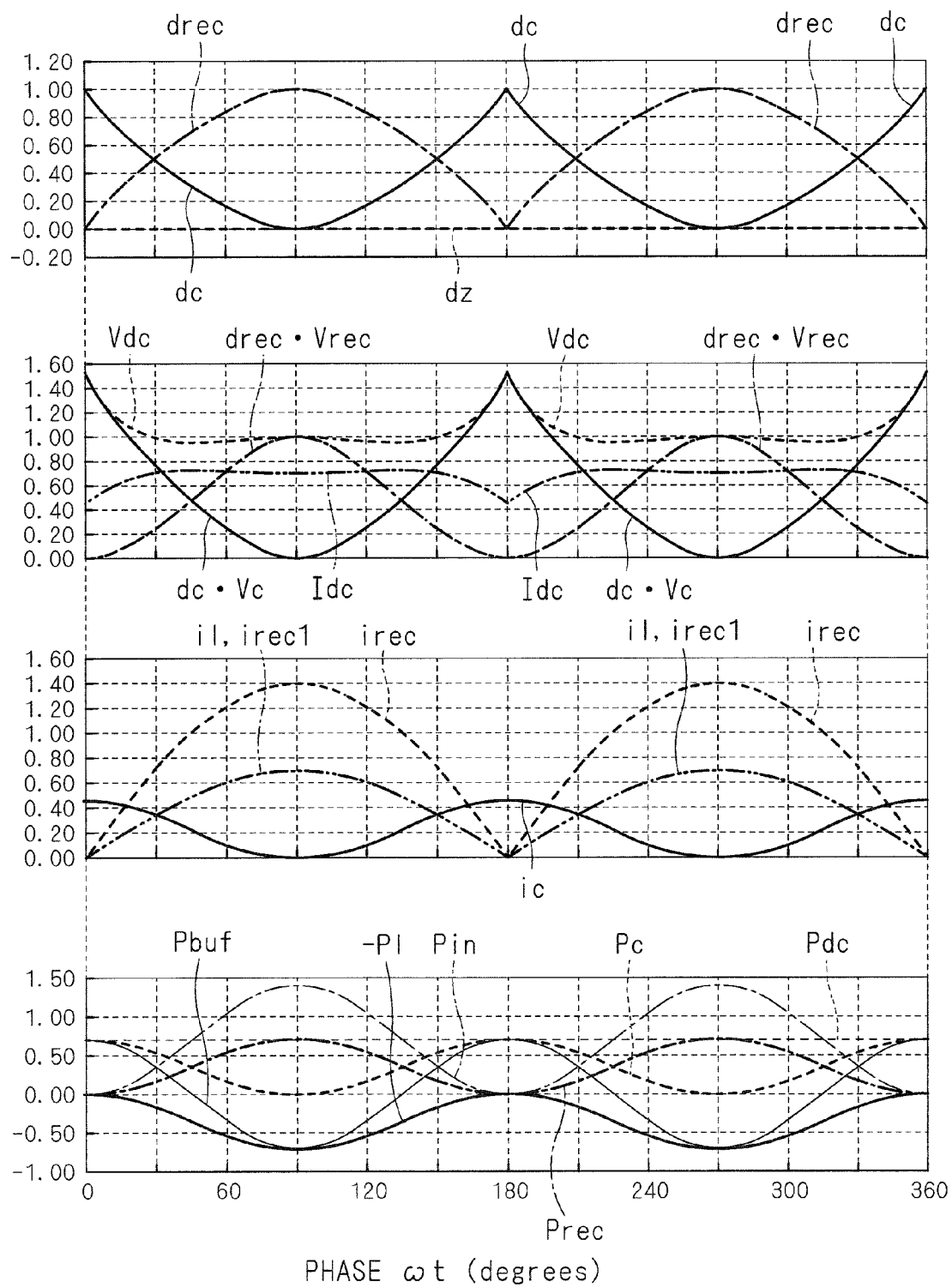

FIGS. 5 and 6 are graphs showing operation of the direct power converter shown in FIG. 1, and show the operation in a case where the duties drec, dc, and dz (=0) are set to satisfy the formulas (14) to (19). Note that k=⅙ in FIG. 5, and k=½ is set in FIG. 6.

In each of FIGS. 5 and 6, the duties drec, dc and dz are shown in the first tier, the virtual DC voltage Vdc, a first component drec·Vrec and a second component dc·Vc of the virtual DC voltage Vdc, and the DC current Idc are shown in the second tier, the current irec (being equal to the absolute value of the input current Iin) output from the converter 3 and the currents irec1, il and ic are shown in the third tier, and the powers Pin, Pc, Pbuf and Prec are shown in the fourth tier. In each of the graphs, the horizontal axis represents the phase ωt with "degree" as the unit.

Note that the first component drec·Vrec of the virtual DC voltage Vdc is a voltage appearing in the first term of the formula (17), and indicates contribution of the converter 3 to the virtual DC voltage Vdc. The second component dc·Vc of the virtual DC voltage Vdc is a voltage appearing in the second term of the formula (17), and indicates contribution of the capacitor C4 to the virtual DC voltage Vdc. Calculation is performed on the assumption that Vm=1, Im=√2, and Vc=1.5Vm=1.5 for convenience sake.

Since k=½ in FIG. 6, pulsations (in the second term of the rightmost-hand side of the formula (1)) of the pulsating power are all cancelled by the power buffer circuit 4. The input power Pdc input into the inverter 5 is thus maintained constant. In this case, irec1=il holds from the formulas (10) and (11).

FIG. 7 is a graph showing the virtual DC voltage Vdc in cases where k=½, ¼ or ⅙, and dz=0. This means that the virtual DC voltage Vdc determined by the formulas (18) and (19) is shown.

As can be understood from the formula (15), drec=0 holds when ωt=nπ, and thus dc=1 holds by setting dz=0. Thus, Vdc=Vc (=1.5) holds when the phase ωt is 0 degrees, 180 degrees, and 360 degrees in FIG. 7. As can be understood from the formula (16), dc=0 holds when ωt=(2n−1)η/2, and thus drec=1 holds by setting dz=0. Thus, Vdc=Vm (=1) holds when the phase ωt is 90 degrees and 270 degrees in FIG. 7.

As can be understood from these graphs, the voltage utilization ratio R higher than the voltage utilization ratio (1/√2) introduced in Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010) and Japanese Patent Application Laid-Open No. 2011-193678 can be obtained.

In a case where dz is not set to zero, the virtual DC voltage Vdc can be set to a constant value. A specific example thereof and an upper limit of the virtual DC voltage Vdc as constant are described below.

As can easily be understood from FIG. 7, the virtual DC voltage Vdc increases with increasing buffer distribution ratio k, and thus a case where k=½ is considered. In this case, the virtual DC voltage Vdc approximately takes the crest value Vm or more in a whole section of the phase wt, but takes the crest value Vm or less when the phase ωt is in a range of 30 degrees to 150 degrees and in a range of 210 degrees to 330 degrees. Even when k=½ and dz=0, the virtual DC voltage Vdc cannot be set to a constant value equal to or more than the crest value Vm.

Figure 8:
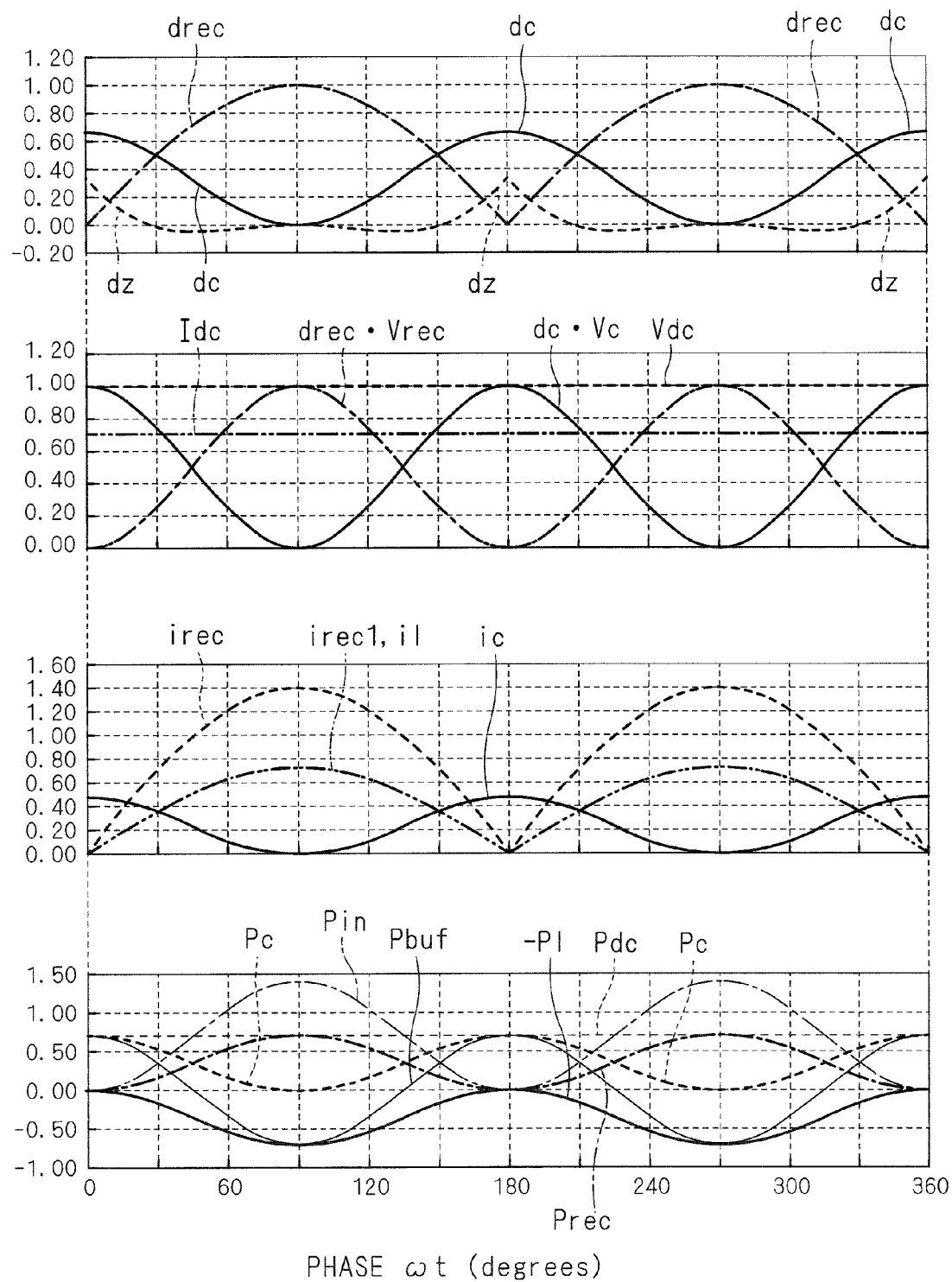
FIG. 8 is a graph showing virtual operation of the direct power converter according to the embodiment.

FIG. 8 is a graph showing operation of the direct power converter in a case where dz<0 is virtually allowed, and Vdc=Vm holds when k=½ while satisfying the formulas (15) and (16). As in FIGS. 5 to 7, calculation is herein performed on the assumption that Vm=1, Im=√2, and Vc=1.5Vm=1.5. With reference to FIG. 7, it is understood that dz<0 holds when the phase ωt is in the range of 30 degrees to 150 degrees and in the range of 210 degrees to 330 degrees.

A maximum value of the virtual DC voltage Vdc that is constant is thus obtained by setting dz=0 as follows. Since the virtual DC voltage Vdc is the highest when k=½ as described above, a condition to satisfy drec+dc=1 in this case is considered. The formula (20) holds by substituting k=½ in the formula (19). Note that x=|sin(ωt)| is introduced.

$$drec + dc = \frac{1}{2} \cdot \left[ x + \frac{Vm}{Vc}(1-x)^2 \right] = 1 \tag{20}$$

Pdc=Vm·Im/2 holds as Pdc=Vdc·Idc and k=½, and thus the formula (21) is obtained.

$$Vdc = \frac{Vm}{2} \cdot \frac{Im}{Idc} = \frac{Vm}{x + \frac{Vm}{Vc}(1-x^2)} \tag{21}$$

The phase ωt providing the maximum value of the virtual DC voltage Vdc provides a minimum value of a denominator of the right-hand side of the formula (21). Therefore, the phase ωt when a value of the formula (22) indicating a derivative of the denominator is zero should be obtained.

$$\frac{d}{d(\omega t)}\left[|\sin(\omega t)| + \frac{Vm}{Vc}(1 - \sin^2(\omega t))\right] = \cos(\omega t) \cdot \left[1 - \frac{2 Vm}{Vc}\sin(\omega t)\right] \tag{22}$$

In this case, x=Vc/(2·Vm). In the above-mentioned example, it is understood that the maximum value of the virtual DC voltage Vdc that is constant is approximately 0.96Vm as Vc=1.5Vm.

Figure 9:
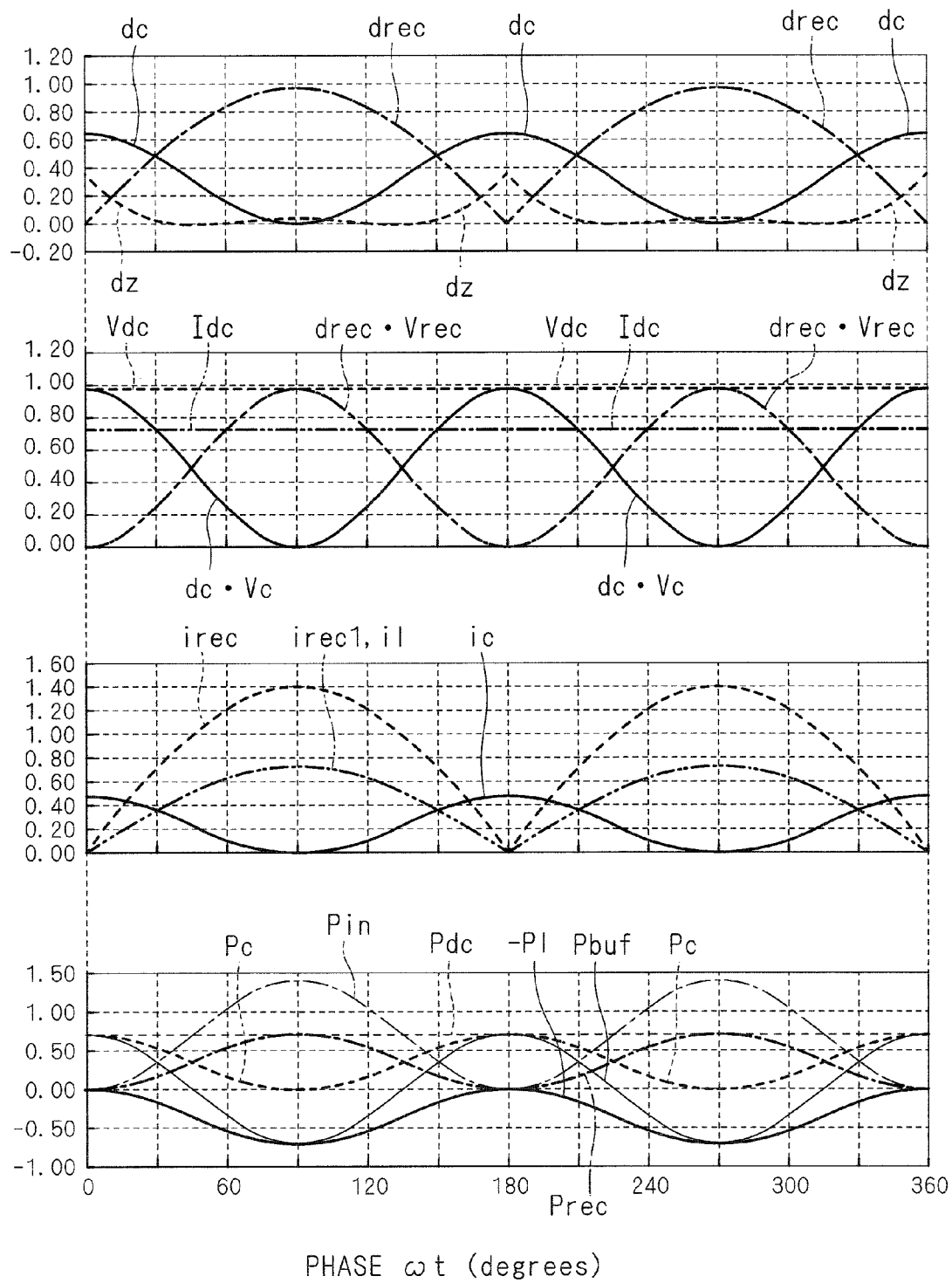
FIGS. 9 and 10 are graphs showing operation of the direct power converter according to the embodiment.

FIG. 9 is a graph showing operation of the direct power converter in a case where Vc=1.5Vm=1.5 and Vdc=0.96Vm=0.96 (Vm=1). It is understood that dz>0 holds in a whole section of the phase wt.

When the buffer distribution ratio k is fixed to ½ as described above, by fixing the duties in accordance with the formulas (14), (15) and (16), the virtual DC voltage Vdc can be set to be constant. It is understood that, with the technique, the voltage utilization ratio R can be set to a/(1+α·α/4) (where α=Vc/Vm) by setting x to Vc/(2·Vm) in the formula (21) by reducing the zero duty dz.

A condition that a ratio α should satisfy to let the voltage utilization ratio R=α/(1+α·α/4) be larger than the voltage utilization ratio (1/√2) introduced in Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010) and Japanese Patent Application Laid-Open No. 2011-193678 is 2√2−2<α<2√2+2. The both-end voltage Vc is charged to be higher than the crest value Vm, and the ratio α is larger than 1. To set the virtual DC voltage Vdc to be constant, α≤2 holds as x=|sin (ωt)|=α/2. The condition is thus satisfied, and the voltage utilization ratio R larger than the voltage utilization ratio (1/√2) introduced in Ohnuma, Itoh, "Circuit Configuration and Control Strategy of single-to-three Phase Power Converter with Active Buffer and Charge Circuit", the 2010 Annual Meeting of the Institute of Electrical Engineers of Japan, 4-057 (2010) and Japanese Patent Application Laid-Open No. 2011-193678 can be obtained.

It is understood that the voltage utilization ratio R takes a maximum value of 1 when a value obtained by differentiating the voltage utilization ratio R with respect to the ratio α is zero, i.e., α=2. That is, the maximum value of 1 of the voltage utilization ratio R can be obtained by setting the both-end voltage Vc to be twice the crest value Vm.

(b-6) Setting of Duties Independent of Constant k

In this section, a technique for setting the duties drec, dc, and dz independently of the buffer distribution ratio k is described. In this section, the duties drec and dc are respectively set by the formulas (23) and (24). The zero duty dz is determined by the formulas (23), (24) and (14).

$$drec = \frac{Vdc}{Vm}|\sin(\omega t)| \tag{23}$$

$$= \frac{Vdc}{Vrec} \cdot \sin^2(\omega t)$$

$$dc = \frac{Vdc}{Vc} \cdot \cos^2(\omega t) \tag{24}$$

$$= \frac{Vdc}{2Vc}(1 + \cos(2\omega t))$$

The rectifying duty drec can be expressed as a value obtained by dividing the product of the square of the sine value of the phase ωt and the virtual DC voltage Vdc by the rectified voltage Vrec, for example. The discharge duty dc can be expressed as a value obtained by dividing the product of the square of a cosine value of the phase ωt and the virtual DC voltage Vdc by the both-end voltage Vc, for example.

It is clear from the formula (25) that the rectifying duty drec and the discharge duty dc thus set satisfy the formula (17).

$$drec \cdot Vrec + dc \cdot Vc = Vdc|\sin(\omega t)| \cdot |\sin(\omega t)| + Vdc \cdot \cos^2(\omega t) \tag{25}$$

$$= Vdc$$

The virtual DC voltage Vdc can thus arbitrarily be set, e.g., to a constant value independent of the phase wt, while the rectifying duty drec and the discharge duty dc are set to values independent of the buffer distribution ratio k.

In this setting, the DC current Idc is expressed by the formula (18) as the relation Pdc=Vdc·Idc=Pin+Pc−Pl holds.

It is assumed that the input current Iin is expressed by Im·sin(ωt), i.e., the input current Iin has a sinusoidal waveform, and thus the current il satisfies the following formula (26) dependently on the DC current Idc.

$$il = Im \cdot |\sin(\omega t)| - drec \cdot Idc \tag{26}$$

$$= \left(Im - \frac{Vdc}{Vm} \cdot Idc\right) \cdot |\sin(\omega t)|$$

The above-mentioned description shows that the rectifying duty drec and the discharge duty dc are set to the values independent of the buffer distribution ratio k, and the virtual DC voltage Vdc can be set to be constant. However, the virtual DC voltage Vdc that is constant has an upper limit. As described in the previous section, the formula (27) holds from the formulas (23) and (24) by considering drec+dc=1 and introducing x=|sin(ωt)|.

$$drec + dc = \frac{Vdc}{Vm} \cdot x + \frac{Vdc}{Vc} \cdot (1-x^2) = 1 \qquad (27)$$

The formula (28) is thus obtained, and is the same as the formula (21). In the above-mentioned example, it is understood that the maximum value of the virtual DC voltage Vdc that is constant is approximately 0.96Vm as Vc=1.5Vm.

$$Vdc = \frac{1}{\frac{x}{Vm} + \frac{1-x^2}{Vc}} = \frac{Vm}{x + \frac{Vm}{Vc}(1-x)^2} \qquad (28)$$

A graph showing operation of the direct power converter obtained when k=½ thus matches the graph of FIG. 9 described in the previous section. For example, the formula (26) matches the formula (11) with k=½ in the formula (18).

In this section, however, the duties drec, dc, and dz are set independently of the buffer distribution ratio k, and thus the buffer distribution ratio k is reduced, and the virtual DC voltage Vdc can be controlled to be constant while the formula (28) is satisfied.

Figure 10:
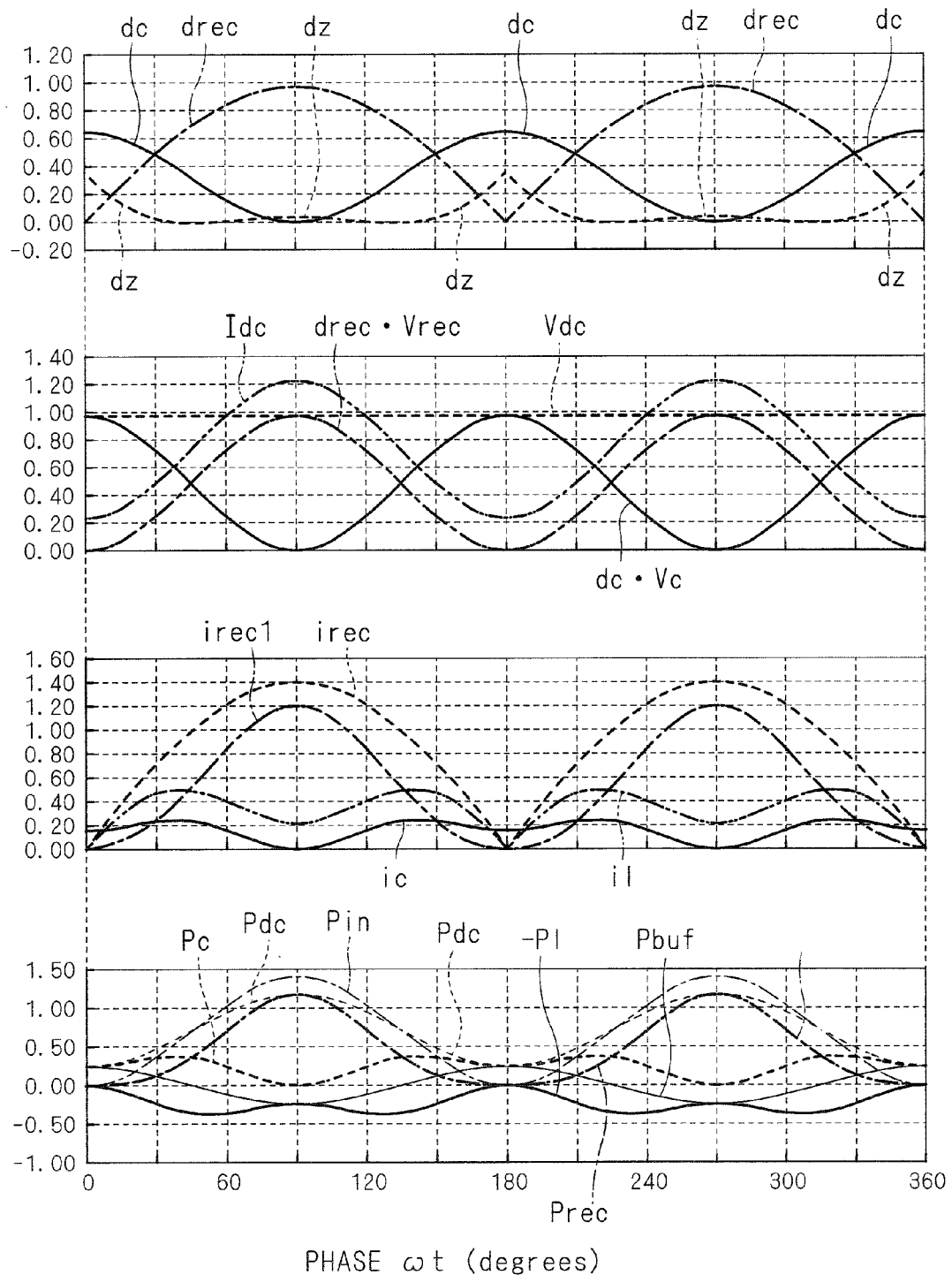

FIG. 10 is a graph showing operation of the direct power converter in a case where Vc=1.5Vm=1.5 and Vdc=0.96Vm=0.96 (Vm=1). It is understood that dz>0 holds in a whole section of the phase wt. The formulas (10) and (11) do not hold in contrast to the technique described in the previous section as k is herein ⅙, which is different from ½. Specifically, the current irec1 is expressed by the formula (29) with reference to the formulas (13), (18) and (23).

$$irec1 = drec \cdot Idc = \frac{Vdc}{Vm}|\sin(\omega t)| \cdot \frac{Vm \cdot \text{Im}}{2Vdc}(1 - (1-2k)\cos(2\omega t)) \qquad (29)$$

$$= \frac{\text{Im}}{2}|\sin(\omega t)| \cdot (1 - (2k)\cos(2\omega t))$$

(b-7) Setting of DC Current Idc

Not only the duties drec, dc, and dz but also the DC current Idc is required to be set based on the formula (18) in a case where any of the techniques described in the above-mentioned sections (b-5) and (b-6) is used. An example to achieve the formula (18) used for the DC current Idc is described in this section.

As for operation of a normal AC load, a case where well-known dq-axis control is performed is taken as an example. A power formula on the dq axes is typically expressed by the formula (30). Symbols V* and I respectively represent a command value of a voltage applied to the AC load and a current flowing through the AC load. They are both alternating, and thus a dot indicating that they are each expressed as a complex number is attached to each of the symbols V* and I. Note that a q-axis voltage ideally follows a command value Vq* thereof, and a d-axis voltage ideally follows a command value Vd* thereof.

$$P+jQ = \dot{V}^* \cdot \dot{I} = Vd^* \cdot Id + Vq^* \cdot Iq + j(Vq^* \cdot Id - Vd^* \cdot Iq) \qquad (30)$$

A power supplied from the DC power supply lines LH and LL to the inverter 5 does not have a reactive power, and thus the power is expressed by the formula (31) by ignoring the third term of the formula (30).

$$Pdc = Vd^* \cdot Id + Vq^* \cdot Iq \qquad (31)$$

On the other hand, the formula (32) holds from the formula (18) as Pdc=Vdc·Idc.

$$Pdc = \frac{Vm \cdot \text{Im}}{2}(1 - (1-2k)\cos(2\omega t)) \qquad (32)$$

$$= \frac{Vm \cdot \text{Im}}{2} - \frac{(1-2k) \cdot Vm \cdot \text{Im}}{2}\cos(2\omega t)$$

Figure 11:
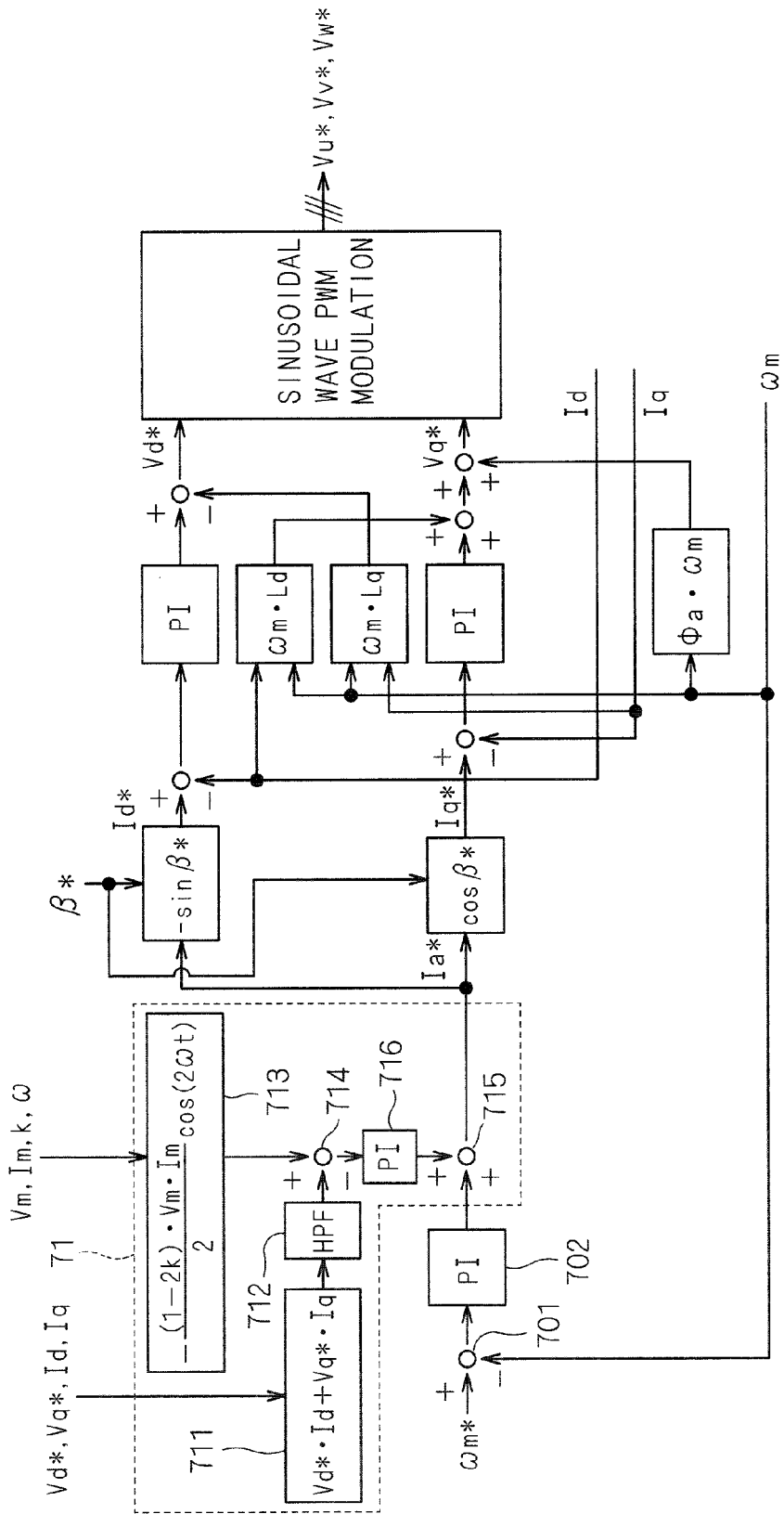
FIG. 11 is a block diagram showing an example of configuration for performing control to achieve a DC current.

Control to achieve the formula (18) can thus be performed by performing control so that an AC component of the formula (31) and the second term of the rightmost-hand side of the formula (32) match each other. FIG. 11 is a block diagram showing an example of configuration to perform the above-mentioned control. This configuration is provided, for example, in configuration shown as a controller 10 in FIG. 1.

A part of the configuration of FIG. 11 showing a well-known technique is briefly described. A current phase command value β* is input to obtain trigonometric function values cos β* and −sin β*, and, from these and a current command value Ia*, a q-axis current command value Iq* and a d-axis current command value Id* are generated. On the assumption that the inductive load 6 is a rotary machine, the q-axis voltage command value Vq* and the d-axis voltage command value Vd* are obtained based on a rotation angular velocity wm of the rotary machine, a field magnetic flux Φa of the rotary machine, d-axis inductance Ld and q-axis inductance Lq of the rotary machine, the q-axis current command value Iq* and the d-axis current command value Id*, and a q-axis current Iq and a d-axis current Id. Voltage command values Vu*, Vv*, and Vw* for controlling the inverter 5 are generated from the q-axis voltage command value Vq* and the d-axis voltage command value Vd*.

In the configuration shown in FIG. 1, for example, a velocity detector 9 detects the AC currents Iu, Iv and Iw flowing through the inductive load 6, and, based on these, the rotation angular velocity wm, the q-axis current Iq and the d-axis current Id are provided to the controller 10.

The controller 10 obtains, based on the voltage command values Vu*, Vv*, and Vw*, signals SSup, SSvp, SSwp, SSun, SSvn and SSwn (see FIG. 1) for respectively controlling operation of the switching elements Sup, Svp, Swp, Sun, Svn and Swn of the inverter 5 through arithmetic processing, which is not shown (see, for example, Japanese Patent Application Laid-Open No. 2011-193678).

The controller 10 also generates signals SSc and SSl for respectively controlling operation of the switches Sc and Sl, which are generated based on the duties drec, dc, dz, and dl (see, for example, Japanese Patent Application Laid-Open No. 2011-193678).

A processor 71 for performing control so that the AC component of the formula (31) and the second term of the rightmost-hand side of the formula (32) match each other is described below. The processor 71 includes a DC power calculator 711, a pulsating component extractor 712, a pulsating component calculator 713, a subtracter 714, an adder 715 and a PI processor 716.

The DC power calculator 711 receives the q-axis voltage command value Vq* and the d-axis voltage command value Vd* and the q-axis current Iq and the d-axis current Id, calculates the input power Pdc based on the above-mentioned formula (31), and provides the input power Pdc to the pulsating component extractor 712.

The pulsating component extractor 712 extracts and outputs the AC component of the formula (31). The pulsating component extractor 712 is achieved by a high pass filter HPF, for example.

The pulsating component calculator 713 receives the crest values Vm and Im, the power supply angular velocity ω, and the buffer distribution ratio k, and obtains the second term of the rightmost-hand side of the formula (32). The crest values Vm and Im and the power supply angular velocity ω can be input into the pulsating component calculator 713 as information obtained from the single-phase AC power supply 1 (see FIG. 1).

As described above, the desired processing is causing the AC component of the formula (31) and the second term of the rightmost-hand side of the formula (32) to match each other, and thus control should be performed to reduce a difference between output of the pulsating component extractor 712 and output of the pulsating component calculator 713. The subtracter 714 thus obtains the difference, and a value obtained by performing integral proportional control on the difference by the PI processor 716 is output to the adder 715.

The adder 715 performs processing to correct the current command value Ia* in normal processing with output of the PI processor 716. Specifically, first, a subtracter 701 obtains the deviation of the rotation angular velocity ωm from a command value ωm* thereof in normal processing to obtain the current command value Ia*. A PI processor 702 performs integral proportional control on the deviation to once obtain the current command value Ia*. The adder 715 then performs processing to increase the current command value Ia* with the output of the PI processor 716.

The above-mentioned well-known technique is applied to the current command value Ia* corrected by the processor 71 as described above to generate the q-axis voltage command value Vq* and the d-axis voltage command value Vd*. Such control is control to provide feedback regarding the q-axis voltage command value Vq* and the d-axis voltage command value Vd*, and the q-axis current Iq and the d-axis current Id, and to cause the difference output from the subtracter 714 to be closer to zero. This means that the AC component of the formula (31) and the second term of the rightmost-hand side of the formula (32) can be caused to match each other by performing such control.

C. Modifications (c-1) Selection of Buffer Distribution Ratio k

The buffer distribution ratio k can be set regardless of the magnitude of the load. Such setting is desirable to reduce a ripple current of the capacitor C4 in a light-load range, and to increase the life of the power converter.

On the other hand, the buffer distribution ratio k may be set to decrease with increasing magnitude of the load. In the configuration shown in FIG. 11, for example, the buffer distribution ratio k may be set to be inversely proportional to the current command value Ia* obtained by the adder 715, or may be set to be proportional to an inverse for the sum of the square of the q-axis current Iq and the square of the d-axis current Id. Such setting of the buffer distribution ratio k can be achieved using a well-known technique.

In this case, the direct power converter performs operation to increase the buffer distribution ratio k in inverse proportion to a current flowing through the inductive load 6. Such operation is desired in the following situation, for example. That is to say, as the load of the power converter, there is a case where one having a large inertia, such as a motor for driving a compressor, is used. The large inertia suppresses vibrations of the motor, and eventually suppresses vibrations of the compressor caused by torque variations. However, the effect of the inertia to deal with the torque variations decreases in a low-speed range. The buffer distribution ratio k can be increased to thereby suppress torque variations of the motor, which is a load, in the low-speed range of the motor, i.e., a range in which a small current flows through the inverter.

Alternatively, the buffer distribution ratio k may be set to ½ when the load is equal to or smaller than a predetermined threshold. The buffer distribution ratio k of ½ means that the buffering power Pbuf (corresponding to the power Pc−Pl as the variation: see (b-1)) is equal to the AC component Pin^ of the pulsating power. The predetermined value may be set to zero. In this case, the power Pc−Pl is zero if the pulsating power Pin is zero. In this case, the power Pc−Pl is controlled to be smaller than the pulsating power Pin if the pulsating power Pin is positive.

By setting the threshold to a value corresponding to the predetermined value smaller than a maximum rated power Pin(max) of the pulsating power Pin, buffering of a power can be performed when the pulsating power Pin takes the maximum rated power Pin(max).

When the load exceeds the threshold (the pulsating power Pin exceeds the predetermined value corresponding to the threshold), for example, the buffering power Pbuf may be set to a constant value independently of the pulsating power Pin.

(c-2) Modification of Circuit Configuration

In a case where any of the above-mentioned techniques is used, the filter 2 can also be provided between the converter 3 and the power buffer circuit 4.

FIG. 12 is a circuit diagram in a case where the filter 2 is provided between the converter 3 and the power buffer circuit 4 as the modification, showing only the vicinity thereof.

When such configuration is used, it is desirable to provide a diode D0 in the DC power supply line LH between the filter 2 and the discharge circuit 4a. An anode of the diode D0 is located on the filter 2 side, and a cathode of the diode D0 is located on the discharge circuit 4a side.

The diode D0 can prevent a both-end voltage across the capacitor C2 from being affected by the both-end voltage Vc across the capacitor C4 by switching of the switch Sc.

While the present disclosure has been described in detail, the foregoing description is in all aspects illustrative and not restrictive. It is therefore understood that numerous modifications that have not been described can be devised without departing from the scope of the present disclosure.

The invention claimed is:
1. A power converter comprising:
a DC link that includes a first power supply line and a second power supply line;
a converter that receives a single-phase AC voltage, and outputs a pulsating power to said DC link;
an inverter that receives a power from said DC link, and outputs an AC current; and
a power buffer circuit that receives a charge power from said DC link, and outputs a discharge power to said DC link, wherein
said charge power is a power distributed from the pulsating power to the power buffer circuit at a distribution ratio, and
when at least said pulsating power exceeds a predetermined value, a difference between said discharge power and said charge power is made smaller than an AC component of said pulsating power by virtue of said distribution ratio being set as a positive value less than ½.

2. The power converter according to claim 1, wherein said predetermined value is set so as to be smaller than a maximum rated power of said pulsating power.

3. The power converter according to claim 1, wherein when said pulsating power is equal to or smaller than a predetermined value, said variation of said discharge power to said charge power is equal to said AC component of said pulsating power.

4. The power converter according to claim 1, wherein when said pulsating power exceeds a predetermined value, said variation of said discharge power to said charge power is independent of said pulsating power.

5. The power converter according to claim 1, wherein a frequency of said AC component of said pulsating power is twice a frequency of said single-phase AC voltage.

6. A power converter comprising:
a DC link that includes a first power supply line and a second power supply line;
a converter that receives a single-phase AC voltage, and outputs a pulsating power to said DC link;
an inverter that receives a power from said DC link, and outputs an AC current; and
a power buffer circuit that receives a charge power from said DC link, and outputs a discharge power to said DC link, wherein
when at least said pulsating power exceeds a predetermined value, a variation of said discharge power to said charge power is smaller than an AC component of said pulsating power,
an input power input from said DC link into said inverter takes a value obtained by subtracting said charge power from a sum of said pulsating power and said discharge power, and
when at least said pulsating power exceeds said predetermined value, said charge power takes a value which is a constant (where said constant is a positive number less than ½) times said pulsating power, and said discharge power takes a value obtained by adding said charge power to (−2) times said AC component of said pulsating power multiplied by said constant.

7. The power converter according to claim 6, wherein said converter
applies a rectified voltage obtained by full-wave rectifying said single-phase AC voltage to said DC link so that a higher electric potential is applied to said first power supply line than said second power supply line, and
allows, when at least said pulsating power exceeds said predetermined value, a current obtained by multiplying a first current by a value obtained by subtracting said constant from 1 to flow through said DC link, said first current being a current obtained by dividing said pulsating power by said rectified voltage, said power buffer circuit includes:
a discharge circuit that includes a capacitor and a first switch that is connected in series to said capacitor between said first power supply line and said second power supply line so as to be closer to said first power supply line than said capacitor is; and
a charge circuit that charges said capacitor, and
when at least said pulsating power exceeds said predetermined value, said power buffer circuit receives a charge current which is said constant times said first current, and outputs a discharge current that is a current obtained by dividing said discharge power by a both-end voltage across said capacitor.

8. The power converter according to claim 6, wherein
said converter applies a rectified voltage obtained by full-wave rectifying said single-phase AC voltage to said DC link so that a higher electric potential is applied to said first power supply line than said second power supply line,
said power buffer circuit includes:
a discharge circuit that includes a capacitor and a first switch that is connected in series to said capacitor between said first power supply line and said second power supply line so as to be closer to said first power supply line than said capacitor is; and
a charge circuit that charges said capacitor,
rectifying duty that is a duty at which said converter is in conduction with said DC link takes a value obtained by dividing a product of a predetermined voltage and a square of a sine value of a phase of said single-phase AC voltage by said rectified voltage, and
a discharge duty that is a duty at which said capacitor discharges takes a value obtained by dividing a product of said predetermined voltage and a square of a cosine value of said phase by a both-end voltage across said capacitor.

9. The power converter according to claim 6, wherein said constant is independent of said AC current.

10. The power converter according to claim 6, wherein said constant is inversely proportional to a magnitude of said AC current.

* * * * *